(12) United States Patent
Hosking

(10) Patent No.: US 7,289,311 B2
(45) Date of Patent: Oct. 30, 2007

(54) POWER RING PULSE CAPACITOR (75) Inventor: Terry Alan Hosking, Barre, VT (US)

(73) Assignee: SBE Inc., Barre, VT (US)

( * ) Notice: Subject to any disclaimer, the term of this patent is extended or adjusted under 35 U.S.C. 154(b) by 298 days.

(21) Appl. No.: 11/160,059

(22) Filed: Jun. 7, 2005

(65) Prior Publication Data
US 2005/0275385 A1 Dec. 15, 2005

Related U.S. Application Data (60) Provisional application No. 60/578,508, filed on Jun. 9, 2004.

(51) Int. Cl.
H01G 4/32 (2006.01)

(52) U.S. Cl. .................. 361/301.5; 361/523; 361/525; 361/528; 361/516; 361/519

(58) Field of Classification Search ............ 361/301.1, 361/301.3, 301.5, 302–305, 523–525, 528–534, 361/516–519
See application file for complete search history.

(56) References Cited

U.S. PATENT DOCUMENTS

| 4,240,127 A | * | 12/1980 | Fanning et al. | 361/304 |
| 4,247,881 A | | 1/1981 | Coleman | 361/302 |
| 4,264,943 A | | 4/1981 | Anderson et al. | 361/511 |
| 4,536,819 A | | 8/1985 | Deutsch | 361/274.3 |
| 4,685,027 A | | 8/1987 | Mouries | 361/308.2 |
| 5,673,168 A | | 9/1997 | Efford et al. | 361/518 |
| 6,909,595 B2 | * | 6/2005 | Erhardt et al. | 361/511 |

* cited by examiner

Primary Examiner—Nguyen T. Ha (57) ABSTRACT

A wound, metallized dielectric film capacitor for pulsed power applications is disclosed. The capacitor forms a wound metallized polymer film in the shape of a closed path ring. The electrical load is placed within the inner opening of the capacitor. The capacitor has low inductance and resistance, scales to high energy levels, and can be formed around the electrical load.

25 Claims, 8 Drawing Sheets

POWER RING PULSE CAPACITOR

This application claims the priority of U.S. Provisional Application Ser. No. 60/578,508 filed Jun. 9, 2004 and entitled "POWER RING PULSE CAPACITOR", the subject matter of which is incorporated herein by reference.

FIELD OF INVENTION

The present invention relates to a multi-layer film capacitor capable of delivering high peak electrical currents and high peak electrical power to an electrical load.

DESCRIPTION OF THE PRIOR ART

Capacitors are electrical devices that are capable of storing electrical energy for later use. The rate of energy storage and the rate of energy discharge from a capacitor are dependent on the application. The required energy storage density per volume or the energy storage density per weight is also determined by the application. Pulsed power applications involve the short-term release of electrical energy from a capacitor over time-scales of nanoseconds to milliseconds, and with peak electrical currents of Amperes to Mega-Amperes. For example, pulsed lasers require a capacitor with the capability to store a large energy density per unit volume, and the ability to discharge that energy very quickly into a load having small electrical impedance. In pulsed power applications, it is desirable to minimize the electrical inductance and the electrical resistance of the capacitor, to maximize the peak current during discharge. It is also desirable to minimize the internal heat generated by repetitive charge and discharge cycles. Further, it is desirable to remove any heat generated within the capacitor as efficiently as possible in order to prevent thermal breakdown or damage of the capacitor, and to allow the capacitor to operate at higher peak currents or higher repetition rates.

Metallized film and film/foil polymeric capacitors are particularly useful for pulsed power applications. In a typical metallized film capacitor, a dielectric polymeric film with its diameter much smaller than its length is coated on one or both sides with a continuous or patterned thin metallic conductive coating. The coated film is then wound on a mandrel, with the electrodes contacted along the two opposite edges of the film. Metallized film capacitors can achieve high energy densities because of the thinness of the metallic coating. However, the maximum current that can be carried by the thin metallic coating is limited by thermal damage and ablation of the coating. Reducing the distance that current must travel through the metallic coating, increasing the cross-sectional area of the coating, or reducing the coating sheet resistance will increase the maximum current capability of the capacitor.

Film/foil polymer capacitors are presently used in applications requiring very high peak currents and short discharge times. A metallic foil is wound in close contact with uncoated polymer film to form the capacitor. The metallic foil can carry much higher currents than a metallized coating. However, the extra space required by the foil reduces the energy density of the capacitor. Some manufacturers combine metallization and foil to optimize a polymeric film capacitor for a particular application.

Annular cross-section capacitors have been previously disclosed. Efford et al. in U.S. Pat. No. 5,673,168 issued Sep. 30, 1997 disclose a high ripple current capacitor where the outer casing is formed to provide good thermal contact with the outer and inner sides and one end of a wound capacitor with annular cross section. The casing has an annular cross section to permit access of cooling fluids to the inner surface of the casing. The design is advantageously employed to improve the rate of removal of heat generated within the capacitor structure, enabling the use of the capacitor at higher ripple currents.

A high current capacitor has been disclosed by Mouries in U.S. Pat. No. 4,685,027 issued Aug. 4, 1987. A high current disc-shaped capacitor and method for producing the same involves winding metallized dielectric films and schooping the two lateral edges of the film to cap-shaped conducting elements which cover the schooped areas. A very flat capacitor is thus obtained, having a low resistive loss and low inductance and minimal thermal impedance. No discussion of the positioning of the capacitor relative to other electrical circuits is given. The cross-sectional shape of the disclosed capacitor has no inner diameter, indicating that the polymer film substantially fills the entire volume defined by the outer diameter of the disc and the distance between the cap-shaped elements.

A cylindrically wound foil capacitor with a heat sink core is disclosed by Deutsch in U.S. Pat. No. 4,536,819 issued Aug. 20, 1985. A heat conducting inner can is introduced to improve heat dissipation of the capacitor and to eliminate the need for pitch or epoxy in the potting of the capacitor roll in an outer casing. Discussion of high current handling capability, low inductance or low electrical resistance of the capacitor is not provided.

Anderson et al. in U.S. Pat. No. 4,264,943 issued Apr. 28, 1981 disclose a hollow cored wound capacitor. The capacitor can provide improved removal of heat generated within the capacitor windings and a reduced inductance compared with totally encapsulated capacitors of similar capacity. The hollow center of the capacitor can be advantageously employed to reduce the physical size of a circuit by placing one or more components within the hollow center. However, these circuit elements are not necessarily connected to the capacitor.

A discoidal (not wound) monolithic ceramic capacitor is disclosed by Coleman in U.S. Pat. No. 4,247,881 issued Jan. 27, 1981, in which a disc-shaped capacitor with a central hole is formed using alternating disc-shaped layers of conductive and dielectric materials. The inner surface and outer surface form the two electrodes of the capacitor. The disclosed device provides reduced inductance and reduced resistive losses and is advantageously employed in radio frequency circuits for signal filtering.

United Chemi-Con has introduced the UTOR series of electrolytic capacitors with a hollow cylindrical shape. The hollow central core is said to improve removal of heat generated in the capacitor, thus improving the maximum ripple current capability of the capacitor. The capacitors are rated for 5000 hours of life at 105 degrees Celcius, with maximum capacitance values of 4,700 microfarads at 450 Volts DC. An annular wound film capacitor is offered for sale by MFD Capacitors in Britain under the part number DO794. It is composed of metallized polymer film wound on an insulating support tube. The part is advantageously deployed in an electronic filter to reduce circuitry volume by allowing the placement of additional electronic components within the hollow core of the capacitor. The capacitor finds utility in DC and low frequency AC applications, but is not suitable for pulsed power applications.

There exists a need for a polymeric capacitor for pulsed power applications that can supply high peak currents, possess a high energy density per unit volume or per unit weight, scale to large values of capacitance or voltage, electrically discharge very quickly with a low internal inductance and low internal resistance, have an efficient means of removing internally generated heat, and not catastrophically fail when unavoidable internal arcs occur. Preferably, the capacitor should have a flexible geometry to allow use in a variety of applications.

SUMMARY OF THE PRESENT INVENTION

Briefly, a metallized film polymeric capacitor is described that is formed into the shape of a closed ring. For example, the closed ring can have a circular shape. The thickness of the capacitor is substantially smaller than the inner and outer radii of the circular closed ring. An electrical load is located within the inner opening of the closed ring. The capacitor can supply high current pulsed discharges to the load with a low Effective Series Inductance (ESL) and a low Effective Series Resistance (ESR), and with minimal internal degradation. Because of the capacitor shape, heat internally generated in the capacitor is efficiently transferred to external conductive surfaces contacting either side of the capacitor. The capacitor preferably is structurally self-supporting and does not require any additional insulating or encapsulating medium. The capacitor can be formed around the electrical load driven by the capacitor, resulting in a minimized inductance and minimized resistance connection between the capacitor and the load.

One advantage of the present invention is that it is very low in weight.

Another advantage of the present invention is that it has a very low ESL.

Another advantage of the present invention is that it has a very low ESR.

Another advantage of the present invention is that the load connected to the capacitor can be placed within the hollow center of the capacitor.

Another advantage of the present invention is that the capacitor can be formed around an irregularly shaped load or around an irregularly shaped housing that later holds the load.

Another advantage of the present invention is that no robust housing is required.

Another advantage of the present invention is that immersion in an insulating medium such as oil is not required.

Another advantage of the present invention is that the capacitance can be scaled to very large values.

Another advantage of the present invention is that the capacitors can be stacked in series to achieve higher voltage ratings.

Another advantage of the present invention is that very high energy density per unit weight and energy density per unit volume can be achieved.

Another advantage of the present invention is that very high pulse discharge currents can be achieved without damaging the capacitor.

Another advantage of the present invention is that when operated at voltages exceeding the damage limit of the capacitor, the device fails gracefully, allowing the definition of a lifetime curve that is related to the number of discharge events and the charging voltage used for each discharging event.

Another advantage of the present invention is that it can be manufactured using simple techniques, resulting in low cost and good repeatability.

Another advantage of the present invention is that, if polypropylene is chosen as the polymeric film, extended use at elevated temperatures up to 105 degrees Celcius does not significantly degrade capacitor life.

DETAILED DESCRIPTION OF THE PREFERRED EMBODIMENTS

Figure 1A:
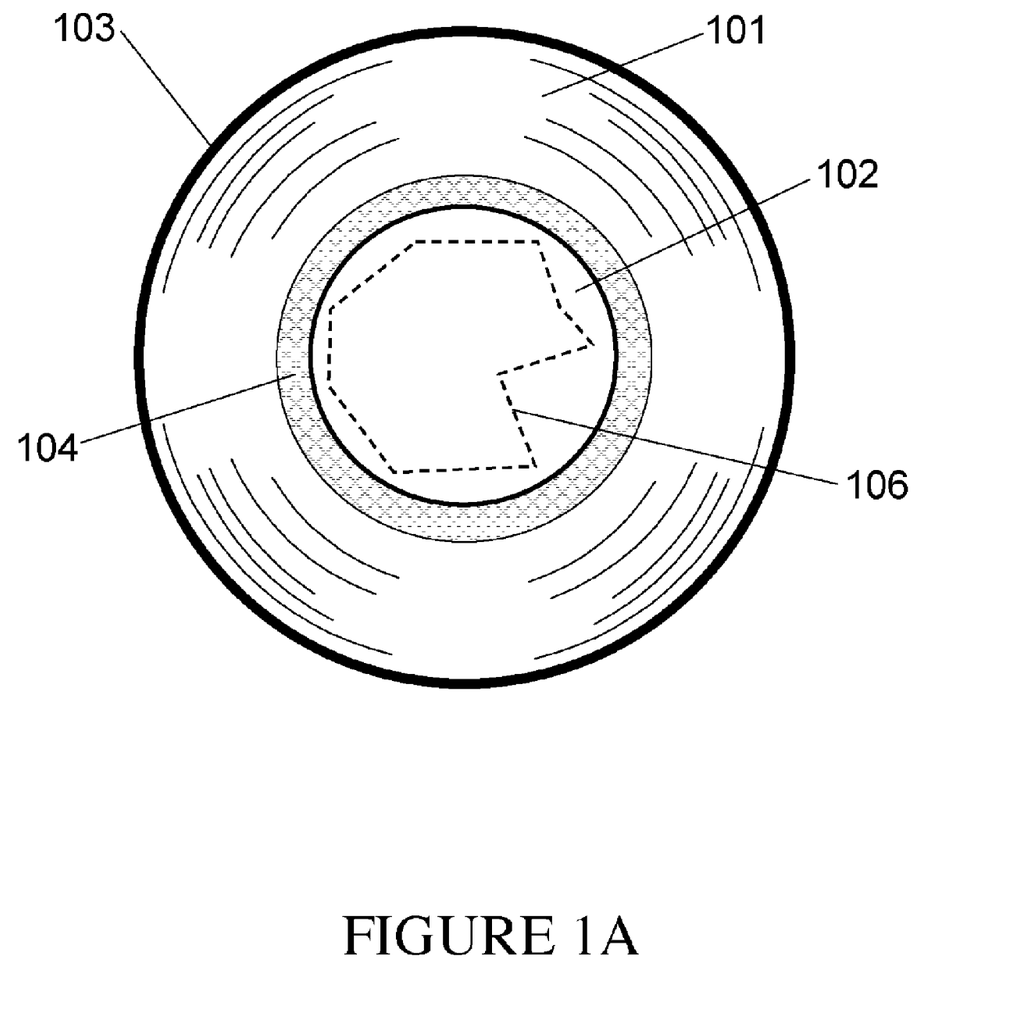
FIG. 1A is a top view of a capacitor.

A metallized film polymeric power ring capacitor is shown in FIG. 1A. The capacitor consists of a body 101 comprised of a plurality of windings of metallized polymeric insulation material. The windings are formed around a central support rod that is later removed, leaving a hollow center 102 of the capacitor. The hollow center 102 is available for locating the electronic load 106 to which the capacitor is connected. The outer diameter of the capacitor is sealed or otherwise fixed using a protective layer 103 such as polymeric resin or insulating tape. The region adjacent to the hollow center supports two electrically conductive flanges 104. Although the FIG. 1A demonstrates a ring capacitor with a circular shape, it is to be understood that a ring capacitor may take on any cross-sectional shape, provided that it forms a simple loop with a closed path. Other examples of capacitor ring shapes include an ellipse, polygon or an irregular smooth curve.

Figure 1B:
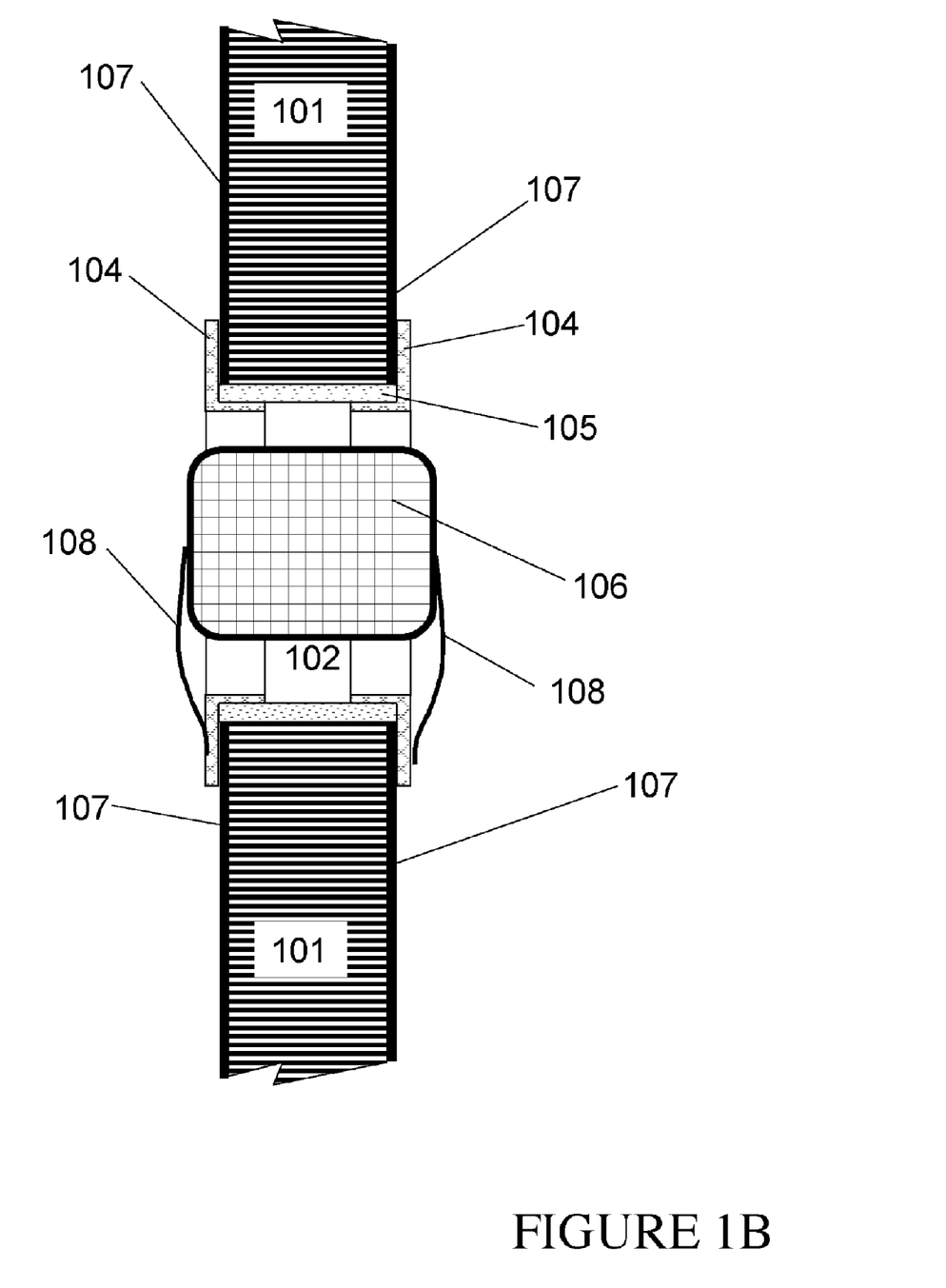
FIG. 1B is a cross-sectional view of a capacitor.

FIG. 1B is a cross-sectional view of the capacitor. As shown in FIG. 1B, each flange 104 is electrically insulated from the inner edge of the capacitor by an insulating film 105. The metallization on the polymeric film is electrically connected to continuous electrodes 107 located on the largest opposing surfaces of the capacitor. The electrodes 107 are preferably formed by spray metallization, a technique known in the art. The electrode material is preferably composed of a material that possesses a high electrical conductivity and a high thermal conductivity, selected from the list including but not limited to zinc, silver, tin, nickel, copper, gold, indium and aluminum. Each flange 104 is electrically and mechanically fastened to one of the electrodes 107. In this manner, the two ends of the capacitor are electrically accessed through the electrically conductive flanges. Each flange 104 is preferably fabricated from a material that possesses a high electrical conductivity, such as copper, aluminum, silver, gold, superconducting compounds such as Yttrium Barium Copper Oxide, or conductive polymers. The load 106 is electrically connected to the capacitor via the two flanges 104 using electrically conductive elements 108, selected from the list including but not limited to wire, cable, braid, strapping and plate. The element 108 is preferably fabricated from a material that possesses a high electrical conductivity, such as copper, aluminum, silver, gold, superconducting compounds such as Yttrium Barium Copper Oxide, or conductive polymers.

In applications where the pulse repetition rate of the capacitor is substantial, a considerable amount of heat is generated within the capacitor. The heat results from high currents flowing through the film metallization, as well as by dielectric losses in the polymer film forming the capacitor body. Removing this heat can allow higher operating temperatures or higher pulse repetition rates. The heat removal is enabled by the geometry chosen for the power ring capacitor. By selecting a capacitor thickness that is much smaller than the outer diameter of the capacitor, heat generated within the capacitor windings can be transferred to the large surface area electrodes 107 via thermal conduction along the film metallization over a small physical length. This reduces the overall thermal resistance of the complete capacitor, and results in a much better ability to remove heat from the capacitor. Heat transferred to the electrodes 107 on either side of the capacitor is preferably removed by contact to a solid, liquid or gaseous thermal transfer medium, selected from the list including but not limited to a metallic heat sink plate, an electrically insulating liquid such as freon, oil, pure water or liquid sodium, or flowing hydrogen or sulfur hexafluoride gas.

Figure 2:
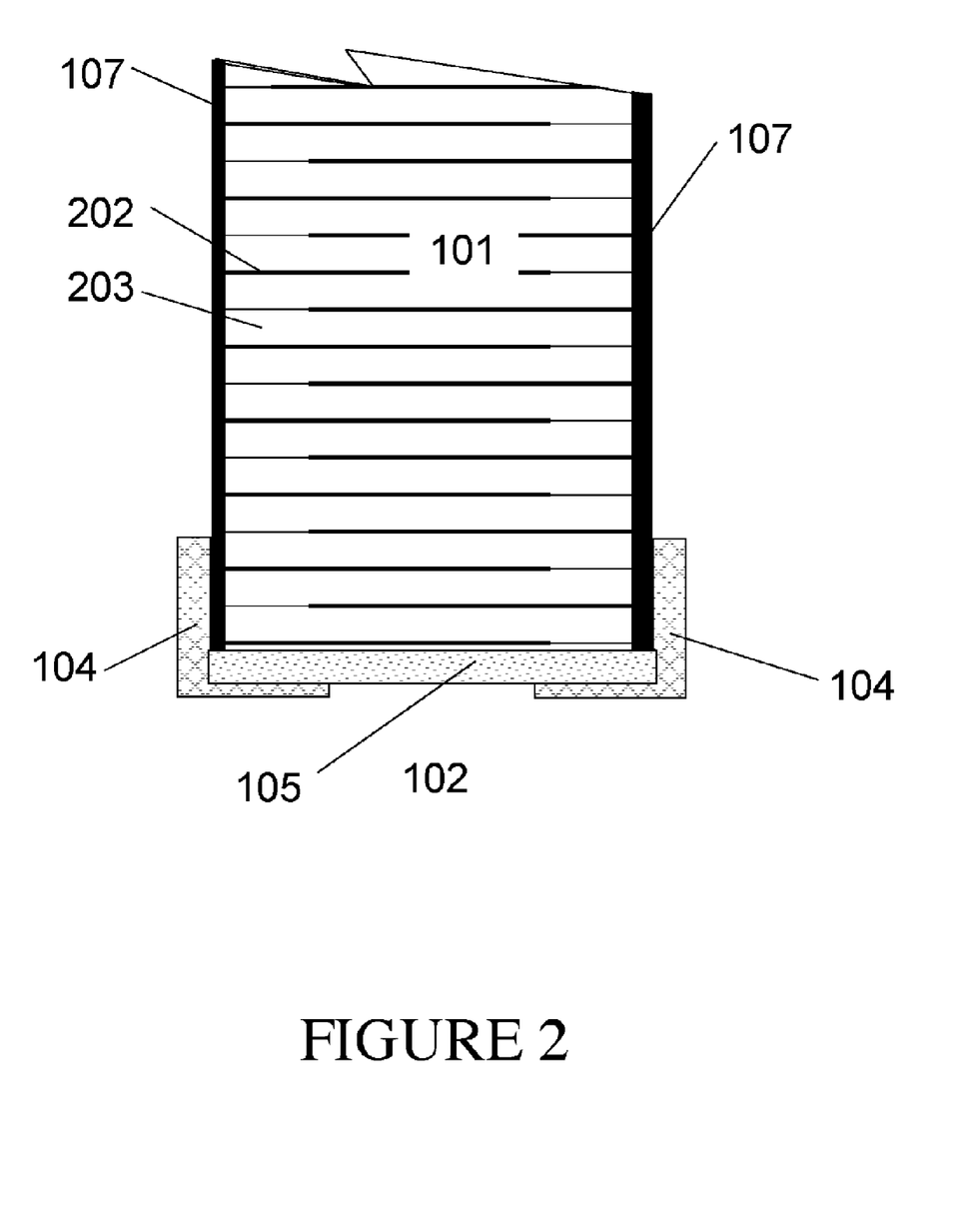
FIG. 2 is a cross-sectional close-up view of the capacitor and electrodes.

FIG. 2 is another cross-sectional view of one portion of the capacitor, showing the region near the hollow center of the capacitor. The capacitor body 101 is comprised of polymeric insulating film 203 coated with a thin metallization 202 that has previously been patterned using methods known to one skilled in the art. The metallization pattern is arranged so that alternating layers of metallization are electrically connected to alternating sides of the capacitor body. The electrical connection between the film metallization 202 and the flange 104 is achieved by spray metallization of layer 107 onto each side of the capacitor body using methods known in the art.

The polymeric film is preferably selected to meet the application requirements. For a high voltage capacitor with low loss, fault clearing capability and a modest temperature requirement (up to 105 degrees Celcius), polypropylene is a suitable choice for polymeric film 203. Other materials can be substituted, such as polyester, polyimide and teflon. Metallization on the polymer film is selected to be highly electrically conducting, nonreactive to polymer films, and thermally conductive. Aluminum is a preferred choice for this material. The insulating layer 105 is chosen to be sufficiently thick to prevent dielectric breakdown between the inner surface of the capacitor body and the electronic load 106 located in the hollow center 102. In addition, the insulating layer 105 is selected to minimize the possibility of an electrical surface arc between the two electrical flanges 104. Polypropylene is a suitable material for film 105.

To maximize the energy stored in a capacitor, two parameters can be adjusted. The stored energy is given by Energy=$0.5 \, C \, V^2$, where Energy is in Joules, C is the capacitance in Farads and V is the maximum charging voltage for the capacitor. The stored energy can be increased by either increasing the capacitance or increasing the voltage. However, doubling the voltage V gives a fourfold increase in stored energy, and generally a preferred method of increasing total stored energy is to increase the maximum allowed voltage for the capacitor. The voltage rating of the capacitor is ultimately determined by the thickness of the polymer film 203. By using thicker polymer film, the breakdown voltage is increased. However, the thickness per winding also increases and the capacitance per winding decreases, resulting in a reduction in the energy stored per unit volume of the capacitor body. The selection of the polymer film 203 involves a tradeoff between these competing factors, and generally lies in the range of one micron to twenty-five microns.

Figure 3:
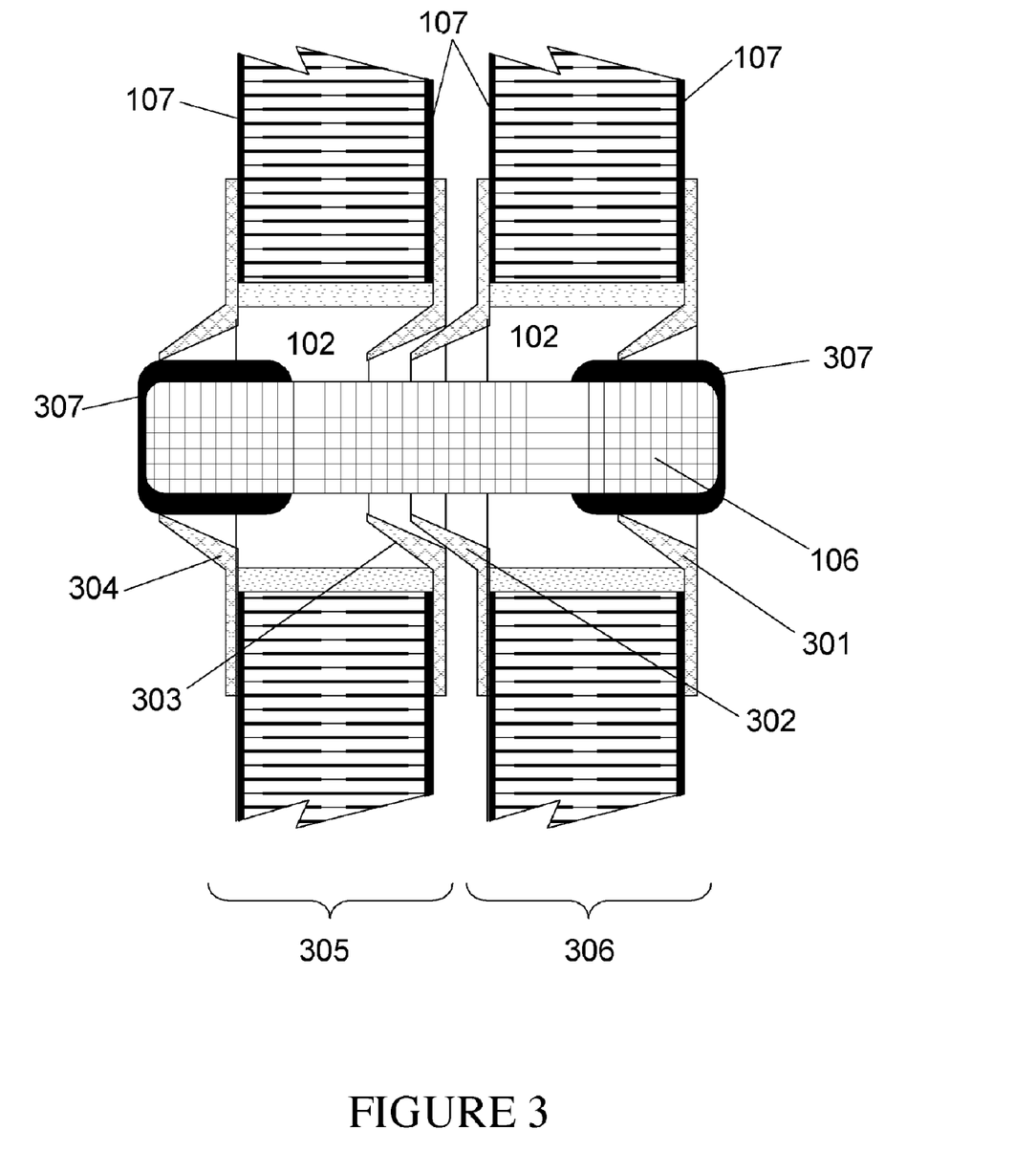
FIG. 3 is a cross-sectional view of two capacitors stacked in series.

A plurality of capacitors can be physically stacked to increase the total voltage available to the electrical load situated within the inner diameter of the capacitors. FIG. 3 shows two capacitors 305 and 306 stacked in series, although additional capacitors can be added. The capacitor 305 has flanges 303 and 304 electrically contacting, and mechanically fastened, to the capacitor body. The capacitor 306 has flanges 301 and 302 electrically contacting, and mechanically fastened, to the capacitor body. The flanges 301, 302, 303 and 304 shown in FIG. 3 are representative only, and can be substituted with a wide variety of flanges having similar mechanical shapes. When stacking the capacitors, the flange 302 slides into the flange 303, resulting in the left hand side of capacitor 306 being electrically connected to the right hand side of capacitor 305. The flanges are designed to provide a self-alignment of the capacitors when they are mated together. The electrical load is placed in the open region 102, with electrical connection means provided between the left hand side of capacitor 305 via flange 304 and the left hand side of the load 106, and between the right hand side of capacitor 306 via flange 301 and the right hand side of the load 106. Additional capacitors can be added to either end of the structure shown in FIG. 3 by extending the length of the load 106. Access to each electrode of each capacitor is available in this design, allowing for electrically charging the capacitors in parallel, and subsequently discharging the capacitors through a series electrical connection into the load 106. This is advantageous for fabricating a high voltage, high peak power electrical pulse generator known as a Marx generator.

Figure 4:
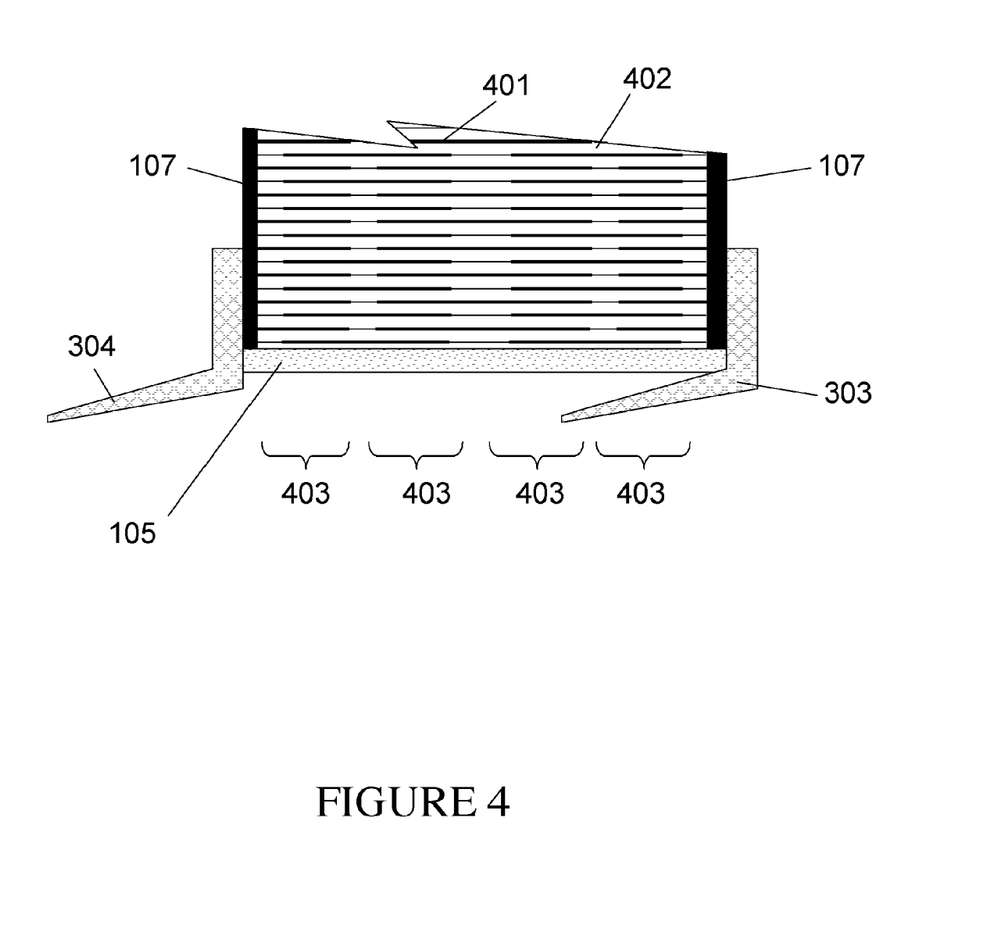
FIG. 4 is a cross-sectional view of the metallization layers in a multi-section capacitor.

Metallized film capacitors have the ability to recover from dielectric short circuits that occur within the capacitor body. The mechanism of recovery is based on selective ablation of metallization at or near the defect site, which isolates the shorted site from the rest of the capacitor. The recovery mechanism is enhanced in metallized film wound capacitors when electrode patterns such as those shown in FIG. 4 are employed. Metallization layers 401 are patterned to form capacitor sections 403. The metallized patterns and methods for making same are known in the art. The total voltage across the capacitor electrodes 107 is divided across the capacitor sections 403. To achieve the optimum result of equal voltage across each section 403, the capacitances of the sections 403 must have the same values.

An alternative method of increasing the voltage rating of the ring capacitor involves adding more sections 403 to the capacitor metallization. The number of sections that can be added is limited by the reduction in current carrying ability of the capacitor. Adding sections 403 to the capacitor increases the distance between the capacitor electrodes 107. The increased distance through which current must flow through the metallization will reduce the maximum current capability of the capacitor.

Figure 5A:
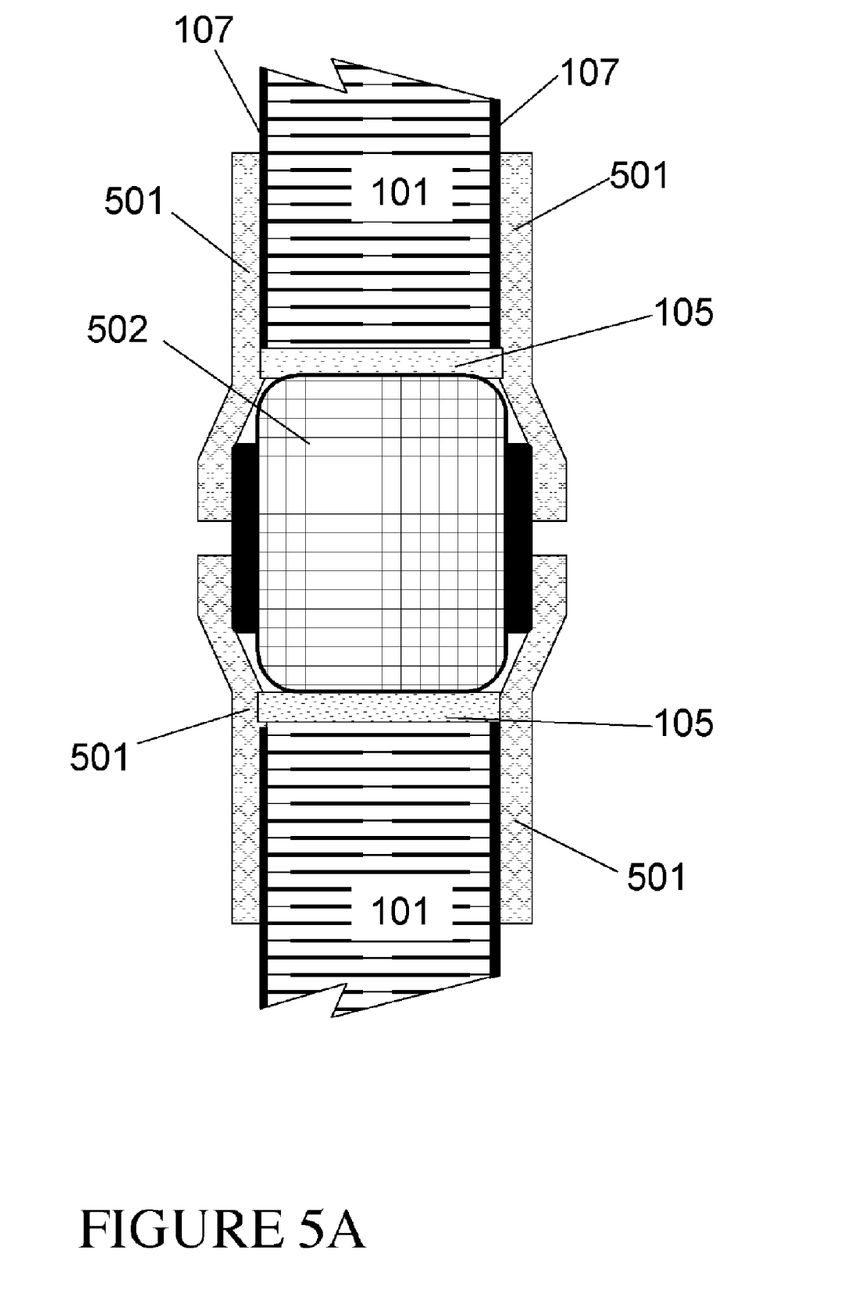
FIG. 5A is a cross-sectional view of a capacitor connected to an electronic load.

FIG. 5A shows an embodiment of a power ring capacitor wound around an electrical load. The electrical load 502 is fastened in a winding machine commonly known in the art for manufacturing wound film capacitors. An insulating layer 105 is attached to the outer surface of the electrical load 502. The capacitor body 101 is then wound onto the electrical load 502. Electrodes 501 are fastened to the opposing surfaces of the capacitor body and provide electrical connection from the capacitor to the electrical load 502. The electrodes 501 can assume a variety of shapes, depending on the application for the capacitor. The width, thickness, length and number of electrodes 501 can be increased to reduce the overall ESR of the capacitor and enable higher peak discharge currents. For example, where the lowest ESR is required, the electrodes 501 can be single, continuous metal plates that are intimately contacting the capacitor metallization layers 107 on either side of the capacitor.

Figure 5B:
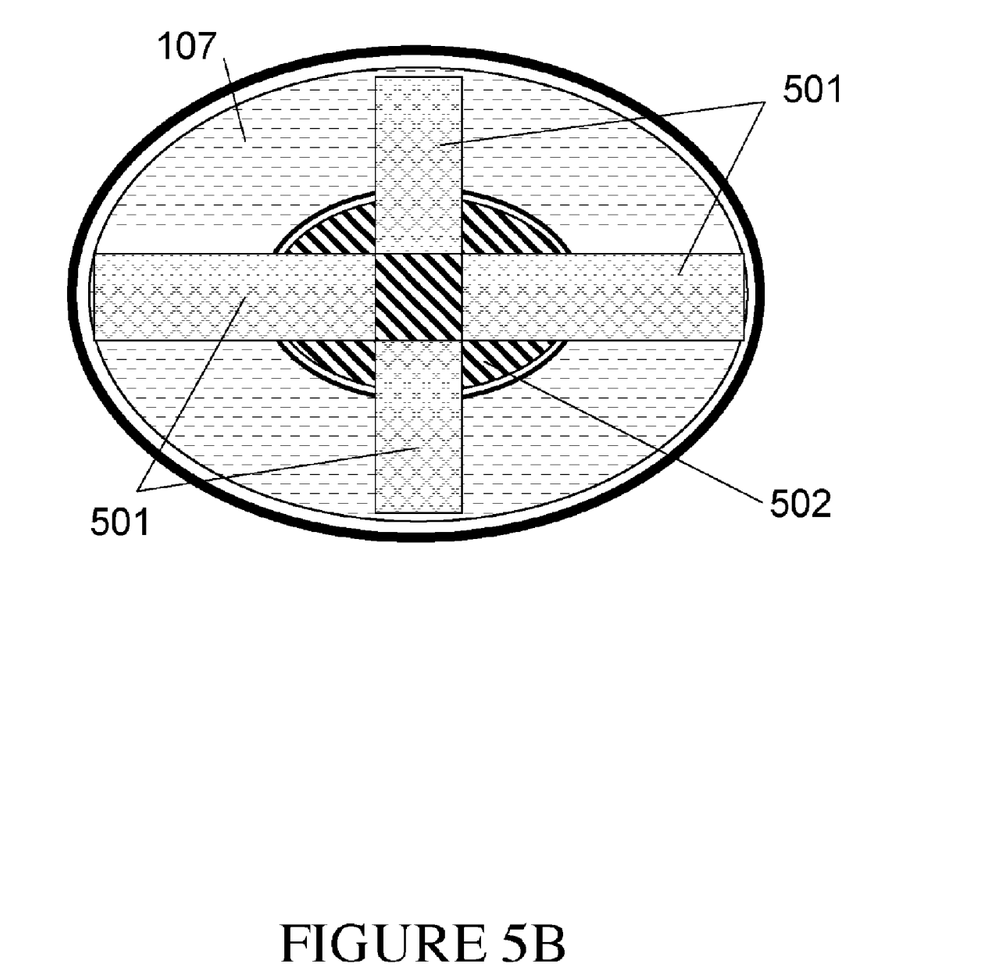
FIG. 5B is a cross-sectional end view of a capacitor connected to an electronic load.

FIG. 5B shows a top view of the capacitor and load assembly, indicating that the cross-sectional shape of the load is an oval. The cross-sectional shape of the electrical load 502 can be any smooth-edged shape.

Figure 5C:
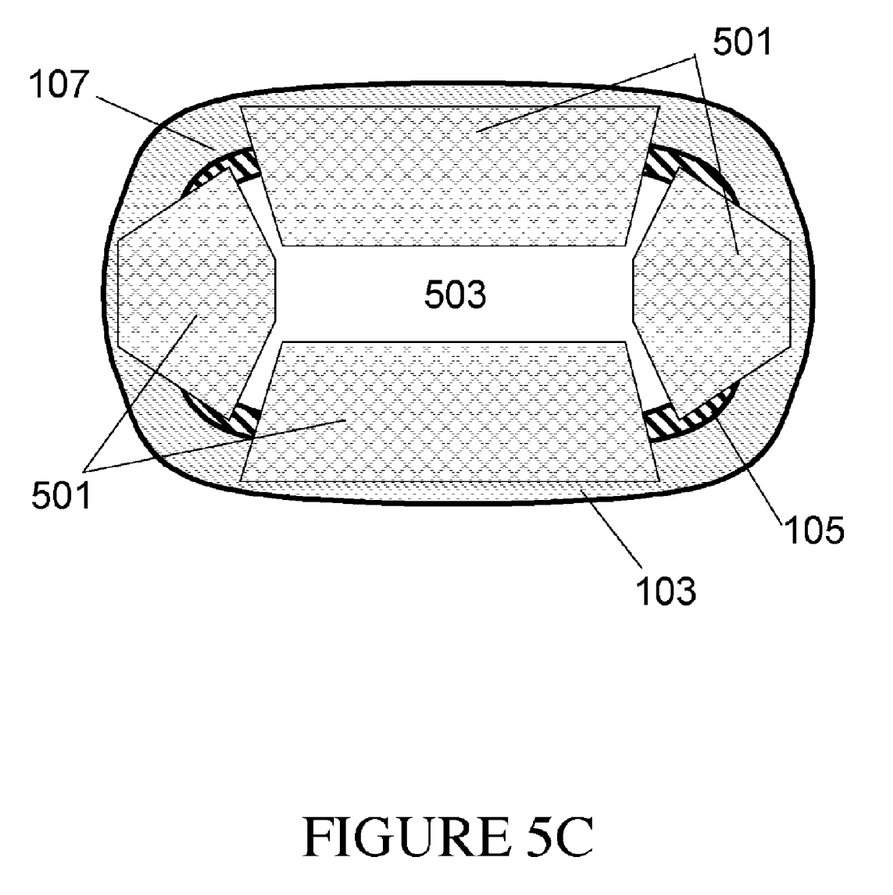
FIG. 5C is an end view of a capacitor forming the outer shell of an electronic housing.

FIG. 5C is an end view of a capacitor fabricated around an electronic housing. The housing 503 preferably has convex sides to enable the winding of a useful capacitor body thereon. The housing 503 can be formed from any material that is compatible with the electronics placed within the housing, including but not limited to metals, plastics, ceramics and fibrous compounds. An insulating layer 105 is attached to the outside of the housing. The capacitor body is wound onto the outside of the insulating layer, and sealed on the outer surface with an insulating barrier 103. The thickness of the capacitor body is preferably less than the cross-section dimensions of the electronic housing 503. Electrically conducting coating 107 is sprayed onto the two ends of the capacitor, and electrically conducting electrodes 501 are fastened to the coating 107 to provide electrical contact between each end of the capacitor and the electronics located inside the electronic housing 503.

The disclosed invention has been reduced to practice. Two polypropylene films with a thickness of 5.8 microns were metallized and wound to form a capacitor body. The capacitor was wound on a round polymer mandrel, and had dimensions of 42.5 mm inner radius, 82.5 mm outer radius and a thickness of 75 mm. The two large surfaces of the capacitor were metallized using an arc spray method known in the art. Copper braid was fastened to the capacitor electrodes using conductive epoxy. The capacitor had a value of 500 microfarads, and was able to sustain peak charging voltages of 3000 volts without damage. When discharged through a short circuit load located within the inner diameter of the capacitor, the peak discharge was 100,000 Amperes. Higher discharge currents resulted in damage inside the capacitor body, but the capacitor remained operational, exhibiting a slowly decaying capacitance versus the number of discharge events.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A pulsed power capacitor having the shape of a closed path ring, comprised of a plurality of windings of at least two metallized dielectric films selected from the list including but not limited to polypropylene and polyester, where the dielectric film thickness is selected to have a value between 0.1 and 100 microns, with electrical connections made to the lateral edges on each side of the wound films, with an inner opening dimension of at least one inch, and thickness less than twice the distance from the center to the outer continuous surface;

means of establishing electrical connections between the two largest opposing surfaces of the capacitor and an electrical load located within the inner opening of the capacitor.

2. The capacitor in claim 1 where the electrical connections between each of the two largest opposing surfaces of the capacitor and the electrical load are selected from the list including but not limited to metal plates, metal braid, metal wire or metal tubing.

3. The capacitor in claim 1 where the metallization on the dielectric film is selected from the list including but not limited to aluminum, zinc, silver, gold and tantalum.

4. The capacitor in claim 1 where an electrically conducting flange is fastened to one end of the inner surface of the capacitor, where the flange is substantially shorter in length than the total thickness of the capacitor, and where the flange makes intimate electrical contact with the arc spray metallization on the large face of the capacitor.

5. The flange in claim 4 where the flange is fabricated from a material selected from the list including but not limited to metals, electrically conducting polymers, electrically conducting ceramics and superconducting ceramics.

6. The flange in claim 4 where the flange is designed to self-align at least two capacitors connected in series when the flange of a first capacitor is mated to an identical flange on a second capacitor.

7. The capacitor in claim 1 where the capacitor body is the protective mechanical housing for the electrical load connected to the capacitor.

8. The capacitor in claim 1 where the capacitor body provides a protective structure to substantially contain the explosive disassembly of the electrical load located within the inner opening of the capacitor.

9. A pulsed power capacitor having the shape of a closed path ring, comprised of a plurality of windings of at least two metallized dielectric films selected from the list including but not limited to polypropylene and polyester, where the dielectric film thickness is selected to have a value between 0.1 and 100 microns, with electrical connections made to the lateral edges on each side of the wound films, with a thickness less than twice the distance from the center to the outer continuous surface;

means of forming the windings onto a mechanical housing suitable for containing the electrical load connected to the capacitor;

means of establishing electrical connections between the two largest opposing surfaces of the capacitor and the electrical load placed in the housing located within the inner opening of the capacitor.

10. The capacitor in claim 9 where the electrical connections between each of the two largest opposing surfaces of the capacitor and the electrical load are selected from the list including but not limited to metal plates, metal braid, metal wire or metal tubing.

11. The capacitor in claim 9 where the metallization on the dielectric film is selected from the list including but not limited to aluminum, zinc, silver, gold and tantalum.

12. The capacitor in claim 9 where an electrically conducting flange is fastened to one end of the inner opening of the capacitor, where the flange is substantially shorter in length than the total thickness of the capacitor, and where the flange makes intimate electrical contact with the arc spray metallization on the large face of the capacitor.

13. The flange in claim 12 where the flange is fabricated from a material selected from the list including but not limited to metals, electrically conducting polymers, electrically conducting ceramics and superconducting ceramics.

14. The flange in claim 12 where the flange is designed to self-align at least two capacitors connected in series when the flange of a first capacitor is mated to an identical flange on a second capacitor.

15. The capacitor in claim 9 where the capacitor body is the protective mechanical housing for the electrical load connected to the capacitor.

16. The capacitor in claim 9 where the capacitor body provides a protective structure to substantially contain the explosive disassembly of the electrical load located within the inner opening of the capacitor.

17. A pulsed power capacitor having the shape of a closed path ring, comprised of a plurality of windings of at least two metallized dielectric films selected from the list including but not limited to polypropylene and polyester, where the dielectric film thickness is selected to have a value between 0.1 and 100 microns, with electrical connections made to the lateral edges on each side of the wound films, with a thickness less than twice the distance from the center to the outer continuous surface;

means of forming the windings onto the electrical load connected to the capacitor;

means of establishing electrical connections between the two largest opposing surfaces of the capacitor and the electrical load located within the inner opening of the capacitor windings.

18. The capacitor in claim 17 where the electrical connections between each of the two largest opposing surfaces of the capacitor and the electrical load are selected from the list including but not limited to metal plates, braid, wire or tubing.

19. The capacitor in claim 17 where the metallization on the dielectric film is selected from the list including but not limited to aluminum, zinc, silver, gold and tantalum.

20. The capacitor in claim 17 where an electrically conducting flange is fastened to one end of the inner opening of the capacitor, where the flange is substantially shorter in length than the total thickness of the capacitor, and where the flange makes intimate electrical contact with the arc spray metallization on the large face of the capacitor.

21. The flange in claim 20 where the flange is fabricated from a material selected from the list including but not limited to metals, electrically conducting polymers, electrically conducting ceramics and superconducting ceramics.

22. The flange in claim 20 where the flange is designed to self-align at least two capacitors connected in series when the flange of a first capacitor is mated to an identical flange on a second capacitor.

23. The capacitor in claim 17 where the capacitor body is the protective mechanical housing for the electrical load connected to the capacitor.

24. The capacitor in claim 17 where the capacitor body provides a protective structure to substantially contain the explosive disassembly of the electrical load located within the inner opening of the capacitor.

25. A system for delivering high peak power or high peak current electrical pulses to an electrical load, comprised of a pulsed power capacitor having the shape of a closed path ring, formed from a plurality of windings of at least two metallized dielectric films selected from the list including but not limited to polypropylene and polyester, where the dielectric film thickness is selected to have a value between 0.1 and 100 microns, with electrical connections made to the lateral edges on each side of the wound films, with an inner opening dimension of at least one inch, with a thickness less than twice the distance from the center to the outer continuous surface;

an electrical load located within the inner diameter of the capacitor;

means of establishing electrical connections between the two capacitor electrodes and an electrical load located within the inner diameter of the capacitor.

* * * * *